United States Patent
Ukita et al.

(10) Patent No.: US 11,165,915 B2
(45) Date of Patent: Nov. 2, 2021

(54) PRINTER, LEARNING DEVICE, AND LEARNING METHOD

(71) Applicant: SEIKO EPSON CORPORATION, Tokyo (JP)

(72) Inventors: Mamoru Ukita, Shiojiri (JP); Tetsuo Tatsuda, Ina (JP); Yuichi Shikagawa, Azumino (JP); Haruhisa Kurane, Shiojiri (JP); Shigenori Katayama, Okaya (JP); Kazunari Tsukada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/752,056

(22) Filed: Jan. 24, 2020

(65) Prior Publication Data

US 2020/0244816 A1 Jul. 30, 2020

(30) Foreign Application Priority Data

Jan. 25, 2019 (JP) .............................. JP2019-010964

(51) Int. Cl.
 *H04N 1/00* (2006.01)
 *G06N 3/08* (2006.01)
 *G06N 20/00* (2019.01)

(52) U.S. Cl.
 CPC ............. *H04N 1/0032* (2013.01); *G06N 3/08* (2013.01); *G06N 20/00* (2019.01); *H04N 1/00708* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 5,627,947 A | * | 5/1997 | Chan | B41J 19/202 |
| | | | | 177/245 |
| 2008/0049062 A1 | * | 2/2008 | Igarashi | B41J 29/02 |
| | | | | 347/16 |
| 2010/0071576 A1 | * | 3/2010 | Leonhardt | B41F 33/0036 |
| | | | | 101/486 |

(Continued)

FOREIGN PATENT DOCUMENTS

| | | |
|---|---|---|
| JP | 2003-237057 | 8/2003 |
| JP | 2006-255899 | 9/2006 |

(Continued)

*Primary Examiner* — Helen Zong
(74) *Attorney, Agent, or Firm* — Workman Nydegger

(57) ABSTRACT

A printer including a motor for transporting an object to be transported, the printer includes: a memory storing a machine-learned model configured to output a control parameter of the motor that brings a transport position of the object to be transported close to a reference based on one or more state variables including at least one of a speed of the object to be transported, an acceleration of the object to be transported, a movement amount of the object to be transported, a start position of movement of the object to be transported, an ambient environment of the printer, a value of a current flowing through the motor, a type of a print medium onto which printing is to be performed by the printer, and an accumulated movement amount of the object to be transported; and a controller configured to control the motor to perform printing by using the control parameter obtained based on the machine-learned model.

9 Claims, 8 Drawing Sheets

(56) References Cited

U.S. PATENT DOCUMENTS

| | | | |
|---|---|---|---|
| 2014/0240800 A1* | 8/2014 | Murayama | H04N 1/028 358/496 |
| 2017/0031331 A1* | 2/2017 | Morita | G05B 13/0265 |
| 2017/0090434 A1 | 3/2017 | Katsuki | |
| 2018/0147835 A1 | 5/2018 | Nakamura et al. | |
| 2018/0272746 A1 | 9/2018 | Yokota | |
| 2019/0368490 A1* | 12/2019 | Maishigi | F04C 25/02 |

FOREIGN PATENT DOCUMENTS

| | | |
|---|---|---|
| JP | 2008-030216 | 2/2008 |
| JP | 2009-262536 | 11/2009 |
| JP | 2016-170253 | 9/2016 |
| JP | 2017-034845 | 2/2017 |
| JP | 2017-070105 | 4/2017 |
| JP | 2018-083404 | 5/2018 |
| JP | 2018-158509 | 10/2018 |

\* cited by examiner

PRINTER, LEARNING DEVICE, AND LEARNING METHOD

The present application is based on, and claims priority from JP Application Serial Number 2019-010964, filed Jan. 25, 2019, the disclosure of which is hereby incorporated by reference herein in its entirety.

BACKGROUND

1. Technical Field

The present disclosure relates to a printer, a learning device, and a learning method.

2. Related Art

In a printer, motors are sometimes used for transporting an object to be transported, such as a print medium, a carriage, and the like. When a motor transports an object to be transported, the motor is controlled by various methods, such as PID control, or the like, and the object to be transported is transported by operation of the motor. When controlling the motor, it is necessary to determine various control parameters (for example, proportional gain, integral gain, derivative gain, and the like in the PID control). Up to now, the control parameters have been determined by trial and error, or the like, and printers that operate using such control parameters have been shipped. In such cases, when the stop characteristic of a motor is changed by the external environment, or the like, the positioning accuracy of an object to be transported deteriorates. Accordingly, various correction techniques have been developed to date. For example, JP-A-2008-30216 discloses a technique that compares the real stop characteristic of a motor with a reference stop characteristic and corrects the control parameters so as to obtain the reference stop characteristic.

However, in the related art, it has been sometimes difficult to correct the control parameters with high precision in accordance with deterioration of a motor over time, the characteristics of an object to be transported, and a use environment.

SUMMARY

According to an aspect of the present disclosure, there is provided a printer including a motor for transporting an object to be transported, the printer including: a memory storing a machine-learned model configured to output a control parameter of the motor that brings a transport position of the object to be transported close to a reference based on one or more state variables including at least one of a speed of the object to be transported, an acceleration of the object to be transported, a movement amount of the object to be transported, a start position of movement of the object to be transported, an ambient environment of the printer, a value of a current flowing through the motor, a type of a print medium onto which printing is to be performed by the printer, and an accumulated movement amount of the object to be transported; and a controller configured to control the motor to perform printing by using the control parameter obtained based on the machine-learned model. With this configuration, it becomes possible to control the motor using a control parameter optimized in accordance with the state of the printer and to maintain a state in which the transport position of the object to be transported is close to the reference (the positioning accuracy is high) over a long time period.

Further, in the above-described printer, learning of the machine-learned model may be performed by observing at least one of the state variables, determining an action to change the control parameter based on the observed state variables, and optimizing the control parameter based on a deviation from the reference of the transport position of the object to be transported. That is to say, by learning the machine-learned model using reinforcement learning, it is possible to easily define a control parameter optimized to increase the positioning accuracy by bringing the transport position of the object to be transported close to the reference.

Further, in the above-described printer, the deviation from the reference may be identified based on an image indicating the transport position of the object to be transported captured by a camera included in the printer. With this configuration, it is possible to identify the deviation from the reference by a camera included in the printer, which is used for learning the machine-learned model, and it is not necessary to measure the printed print medium by another device, or the like. Accordingly, the operation regarding learning becomes simple.

Further, in the above-described printer, the image indicating the transport position of the object to be transported may be a captured image of an adjustment pattern printed by the printer on a print medium. With this configuration, it is possible to identify a deviation from a reference by evaluating a print result of a typical adjustment pattern.

Further, in the above-described printer, when an object printed on the print medium is larger than a specified size, the deviation from the reference may be assumed to have occurred, whereas when an object printed on the print medium is smaller than or equal to the specified size, the deviation from the reference may be assumed to have not occurred. With this configuration, it is possible to simply evaluate the deviation from a reference of the transport position of the object to be transported.

Further, in the above-described printer, based on a reward that increases as the deviation from the reference decreases, learning of the machine-learned model may be performed by optimization of the control parameter by repeating observation of the state variables, determination of the action in accordance with the state variables, and evaluation of the reward obtained by the action. With this configuration, by learning a machine-learned model using reinforcement learning to bring the transport position of the object to be transported close to a reference so that it is possible to easily define a control parameter optimized for increasing the positioning accuracy.

Further, in the above-described printer, the machine-learned model may be learned for each print speed of the printer. With this configuration, it becomes possible to obtain a control parameter suitable for each print speed used by the printer.

Further, according to an aspect of the present disclosure, there is provided a learning device of a machine-learned model referenced by a printer including a motor for transporting an object to be transported, the learning device including: a learning section configured to obtain, as the machine-learned model, a model configured to output a control parameter of the motor that brings a transport position of the object to be transported close to a reference based on one or more state variables including at least one of a speed of the object to be transported, an acceleration of the object to be transported, a movement amount of the object to be transported, a start position of movement of the object to be transported, an ambient environment of the printer, a value of a current flowing through the motor, a type of a print medium onto which printing is to be performed by the printer, and an accumulated movement amount of the object to be transported. That is to say, the disclosure is realized as a learning device of a machine-learned model that outputs a control parameter.

DESCRIPTION OF EXEMPLARY EMBODIMENTS

Hereinafter a description will be given of an embodiment of the present disclosure in the following order with reference to the accompanying drawings. In this regard, the same symbol is given to a corresponding component in each drawing, and duplicated descriptions will be omitted.
1. Configurations of Printer and Learning Device
2. Determination of Control Parameters
2.1 Learning of Machine-learned model
2.2 Learning Example of Control Parameters
3. Print Processing
4. Other Embodiments

1. Configuration of Printer and Learning Device

Figure 1:
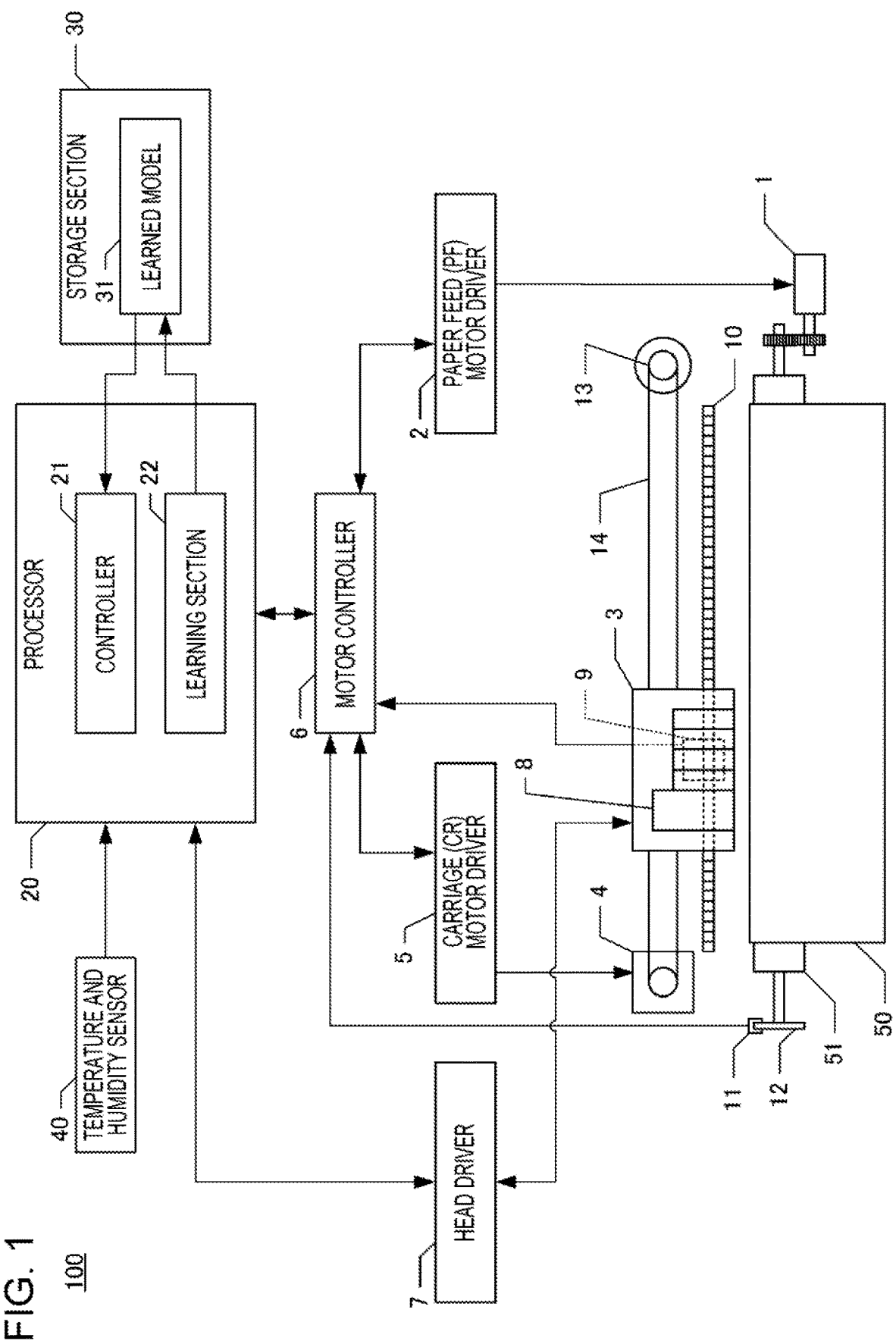
FIG. 1 is a diagram illustrating the configuration of a printer.

FIG. 1 is a block diagram illustrating the schematic configuration of a printer and learning device according to an embodiment of the present disclosure. A printer 100 illustrated in FIG. 1 includes a paper feed motor (hereinafter also referred to as a PF motor) 1 that feeds paper, a PF motor driver 2, a carriage 3, a carriage motor (hereinafter also referred to as a CR motor) 4, a CR motor driver 5, a motor controller 6, and a head driver 7.

Also, the printer 100 includes a camera 8, a (linear) encoder 9, a (linear) encoder code plate 10, a (rotary) encoder 11, a (rotary) encoder code plate 12, a pulley 13, a timing belt 14, a processor 20, a memory 30, a temperature and humidity sensor 40, and a PF roller 51 that transports a print medium 50. In FIG. 1, the other components included in the printer 100 are omitted, and for example, a pump that controls sucking out of ink to prevent clogging of a head, and the like may be disposed in the printer 100.

The temperature and humidity sensor 40 outputs the information indicating the ambient temperature and humidity of the printer 100. In the present embodiment, the PF motor 1 is rotationally driven by the PF motor driver 2. When the PF motor 1 rotates, the PF roller 51 is rotated via a gear or the like to transport the print medium 50.

The CR motor 4 is rotationally driven by the CR motor driver 5. When the CR motor 4 rotates forward and backward, the carriage 3 is moved reciprocally via the timing belt 14. The carriage 3 includes a head not illustrated in FIG. 1, and ink droplets of inks of a plurality of colors are discharged under the control of the head driver 7. Thereby, printing is performed on the print medium 50.

In this manner, in the present embodiment, it is possible to perform printing in a two-dimensional range on the print medium by using the reciprocal movement of the carriage 3 in a straight line and the transport of the print medium by the PF roller 51. In the present embodiment, the movement direction of the carriage 3 is referred to as a main scanning direction, and the movement direction of the print medium by the PF roller 51 is referred to as a sub scanning direction. In the present embodiment, the main scanning direction and the sub scanning direction are perpendicular to each other.

The head driver 7 generates a voltage to be applied to a head, not illustrated in FIG. 1, included in the carriage 3 and controls the voltage supply to each head. When a voltage is supplied to each head, ink droplets are discharged in accordance with the voltage, and printing on the print medium is thereby performed.

In the present embodiment, the carriage 3 includes the camera 8. The camera 8 includes a light source and a sensor that are not illustrated in FIG. 1. Accordingly, it is possible to obtain an image on the print medium 50 in a state in which the print medium 50 is illuminated by the light source. The camera 8 is mounted on the carriage 3 so that it is possible for the camera to capture an image at any position in the main scanning direction by moving the carriage 3. In the present embodiment, it is possible to obtain an image of the print medium 50 on which printing has been performed and an image of the print medium 50 on which printing has not been performed.

The motor controller 6 includes a circuit that outputs respective DC current command values to the PF motor driver 2 and the CR motor driver 5. The PF motor driver 2 rotationally drives the PF motor 1 with a current in accordance with a DC current command value. The CR motor driver 5 rotationally drives the CR motor 4 with a current in accordance with a DC current command value.

The encoder code plate 10 is an elongated member on which slits are formed at predetermined intervals and is fixed in the printer 100 in the main scanning direction. The encoder 9 is fixed at a position corresponding to the encoder code plate 10 of the carriage 3. The encoder 9 outputs the number of pulses corresponding to the number of slits that have crossed the encoder 9 with movement of the carriage 3 so as to output information indicating the position of the carriage 3.

The encoder code plate 12 is a thin, circular-plate member on which slits are radially formed at a predetermined angle and is fixed to the shaft of the PF roller 51. The encoder 11 is fixed at a position that does not prevent rotation of the encoder code plate 12 on the periphery of the encoder code plate 12. The encoder 11 outputs the number of pulses corresponding to the number of slits that have crossed the encoder 11 with rotation of the PF roller 51 so as to output the information indicating the position (rotation angle) of the PF roller 51.

The processor 20 includes a CPU, a RAM, a ROM, and the like not illustrated in FIG. 1 and is able to execute a program stored in the ROM, or the like. The processor 20 may have various kinds of configuration and may be implemented as an ASIC, a GPU, or the like. The processor 20 controls each section of the printer 100 by executing the program.

The processor 20 is capable of controlling various control targets in the printer 100. Here, a description is given mainly of print control and control for improving the positional precision of the objects to be transported (print medium 50 and carriage 3). Executing the program for the control causes the processor 20 to function as the controller 21. In the print control, the controller 21 performs the image processing based on image data indicating a print target so as to identify an ink color, the size of an ink droplet, and the like to be discharged onto the print medium 50 on a per-pixel basis. In accordance with the processing result, the controller 21 obtains a time-series target position of the PF motor 1 and the CR motor 4 necessary for printing ink droplets on the print medium 50 and the drive timing of the head.

The controller 21 provides instructions on the control goals to the motor controller 6 to cause the PF motor 1 and the CR motor 4 to drive the PF roller 51 and the carriage 3, respectively, to obtain the respective target positions.

That is to say, the controller 21 outputs a time-series target position (target rotation angle) of the PF motor 1 necessary when rotating the PF roller 51 to transport the print medium 50. The motor controller 6 outputs a current value for causing the PF motor 1 to drive to the target position. The PF motor driver 2 drives the PF motor 1 to drive to the target position based on the current value.

Also, the controller 21 outputs to the motor controller 6 a time-series target position of the carriage 3 necessary when performing main scan of the carriage 3. The motor controller 6 outputs a current value for moving the carriage 3 to the target position. The CR motor driver 5 drives the CR motor 4 so as to move the carriage 3 to the target position based on the current value.

Further, the controller 21 performs control for recording ink droplets on the print medium 50 in accordance with the drive timing of the head obtained by the image processing. That is to say, the controller 21 outputs drive timing of the head and an ink droplet amount (the size of an ink dot) in accordance with the drive timing to the head driver 7. The head driver 7 generates a voltage for discharging an ink droplet in a specific amount at the drive timing and supplies the voltage to each head. The head of the carriage 3 is driven by the voltage and discharges the ink droplet to perform printing on the print medium 50.

In the present embodiment, as described above, the processing is performed in sequence for transporting the print medium 50, transporting the carriage 3, and discharging ink droplets from the head to perform printing. In such printing, to maintain print quality, it is necessary to transport the print medium 50 and the carriage 3, which are objects to be transported to a target position with high precision. Thus, the motor controller 6 according to the present embodiment controls the PF motor 1 and the CR motor 4 by feedback control.

Figure 2:
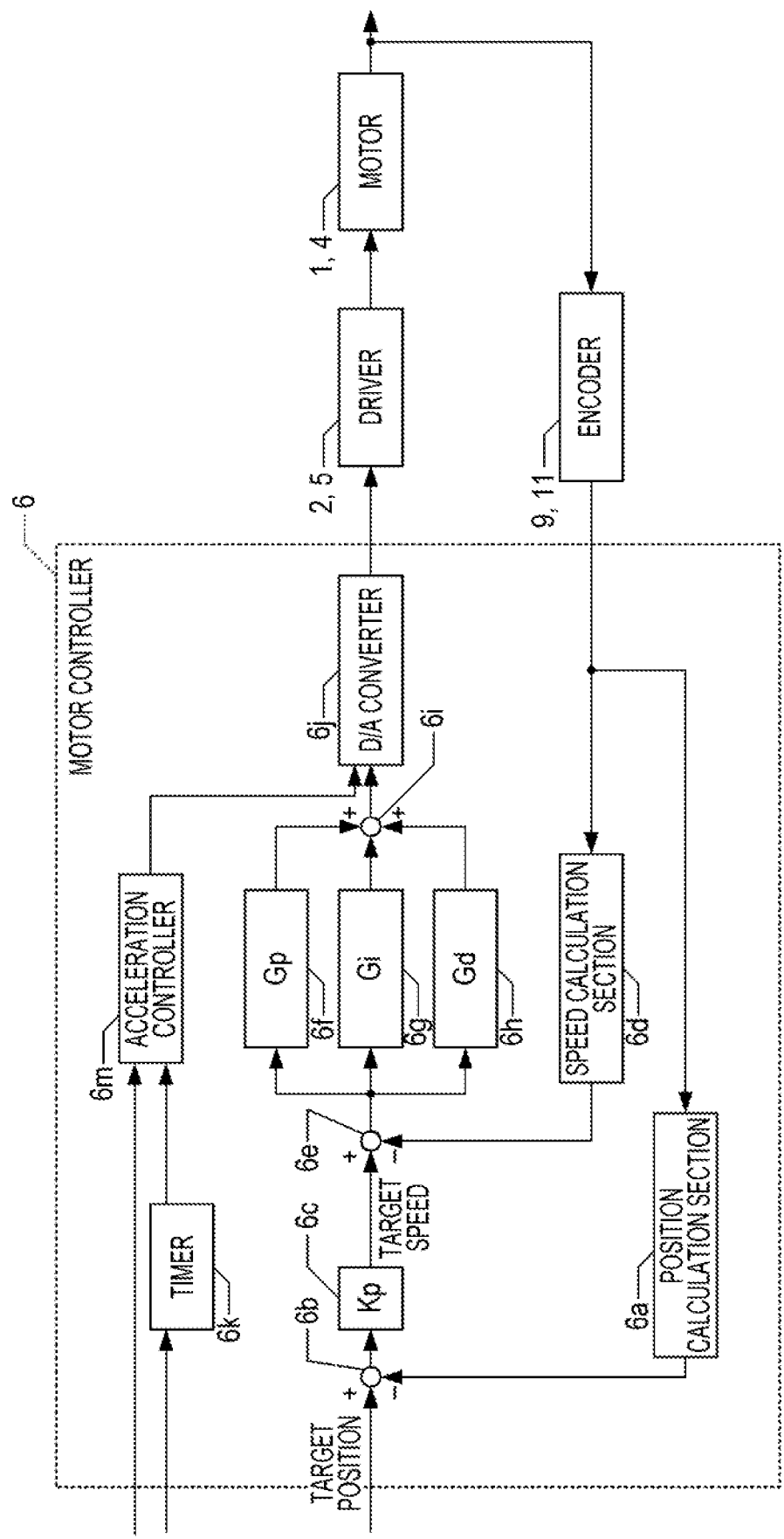
FIG. 2 is a diagram illustrating the configuration of a motor controller.

FIG. 2 is a block diagram illustrating the configuration of the motor controller 6. In the motor controller 6, two pairs of the same circuits are provided for controlling the PF motor 1 and the CR motor 4, respectively (the control parameters may, however, be different). However, a description will be given here without distinguishing either. The motor controller 6 includes a position calculation section 6a, a subtractor 6b, a target speed calculation section 6c, a speed calculation section 6d, a subtractor 6e, a proportional element 6f, an integral element 6g, a derivative element 6h, an adder 6i, a D/A converter 6j, a timer 6k, and an acceleration controller 6m.

The position calculation section 6a detects the output pulses of the encoders 9 and 11, counts the number of the detected output pulses, and calculates the positions of the carriage 3 and the PF motor 1 based on the calculated value. The subtractor 6b calculates the position deviation between the target position sent from the controller 21 and the actual position of the carriage 3 and the PF motor 1, which have been obtained from the position calculation section 6a.

The target speed calculation section 6c calculates target speeds of the carriage 3 and the PF motor 1 based on the position deviations, which are output by the subtractor 6b. This calculation is performed by multiplying the position deviations by a gain Kp. The gain Kp is determined in accordance with the position deviations. In this regard, the value of the gain Kp may be stored in a table not illustrated in FIG. 2.

The speed calculation section 6d calculates speeds of the carriage 3 and the PF motor 1 in accordance with the output pulses of the encoders 9 and 11. The calculation of a speed may be performed by various methods. For example, it is possible for the speed calculation section 6d to use a method of counting the time interval between the edges of the output pulses by using a timer counter and dividing the distance of the edges by a count value of the timer counter, and the like. The subtractor 6e calculates speed deviations between target speeds and the actual speeds of the carriage 3 and the PF motor 1, which have been calculated by the speed calculation section 6d.

The proportional element 6f multiplies the above-described speed deviation by a constant Gp to output a multiplication result. The integral element 6g adds the product of the speed deviation and a constant Gi together. The derivative element 6h multiplies the difference between the current speed deviation and the last speed deviation by a constant Gd to output a product. The calculations of the proportional element 6f, the integral element 6g, and the derivative element 6h are performed for each period of the output pulse of the encoders 9 and 11, and, for example, in synchronization with a rising edge of the output pulse.

The output values of the proportional element 6f, the integral element 6g, and the derivative element 6h are added together by the adder 6i. The addition result, that is to say, the drive current of the PF motor 1 and the drive current of the CR motor 4 are sent to the D/A converter 6j, which are converted to analog currents. The PF motor driver 2 and the CR motor driver 5 drive the PF motor 1 and the CR motor 4, respectively, in accordance with the analog voltage.

Also, the timer 6k and the acceleration controller 6m are used for acceleration control. The PID control using the proportional element 6f, the integral element 6g, and the derivative element 6h is used for constant speed control in the middle of acceleration and for speed reduction control.

The timer 6k generates a timer interrupt signal for each predetermined time period based on a clock signal sent from the controller 21. The acceleration controller 6m adds a predetermined current value (for example, 20 mA) to the target current value for each reception of a timer interrupt signal and sends an integration result, that is to say, the target current values of the PF motor 1 and the CR motor 4 at acceleration time, to the D/A converter 6j. In the same manner as in the case of the PID control, the above-described target current value is converted to a corresponding analog current value by the D/A converter 6j, and the PF motor driver 2 and the CR motor driver 5 drive the PF motor 1 and the CR motor 4, respectively, in accordance with the analog current.

2. Determination of Control Parameters

In the configuration described above, by changing the gain Kp and the constants Gp, Gi, and Gd, it is possible to change the operation of the PF motor 1 and the operation of the CR motor 4. Accordingly, these values are the control parameters of the motors. In the printer 100 according to the present embodiment, it is possible to select a plurality of print speeds (for example, there is a low-speed printing mode, in which priority is given to image quality, and a there is a high-speed printing mode, in which image quality is relatively reduced), and the printer 100 is shipped in a state in which the control parameters are determined for each print speed in advance.

However, when the control parameters are fixed values, the control parameters are sometimes not suitable for the environmental change of the printer 100 or for the deterioration over time of the PF motor 1, the CR motor 4, the timing belt 14, and the like. In this case, the transport positions of the print medium 50 and the carriage 3 sometimes deviate from the references (deviate from the control targets). Thus, in the present embodiment, a configuration that enables the control parameters to be changed is used to bring the transport positions of the print medium 50 and the carriage 3 close to the references.

2. 1 Learning of Machine-Learned Model

In the present embodiment, the control parameters are determined by the processor 20 referring a machine-learned model obtained by machine learning. In the present embodiment, a machine-learned model is obtained by reinforcement learning. That is to say, the printer 100 also functions as a learning device, and printing is performed by referring to a machine-learned model obtained by learning. In the following, a description will be given of the reinforcement learning.

In this regard, with the present embodiment, as a result of reinforcement learning, it is possible to realize a state in which the precision of the transport position of an object to be transported is assumed not to be improved to a precision equal to or more than the precision by the current setting values by changing the control parameters, that is to say, the precision of the transport position is assumed to be maximized. In the present embodiment, these states are referred to as optimized states, and the control parameters that enable the optimized states to be realized are referred to as optimized control parameters.

In the present embodiment, the printer 100 functions as a learning section 22 by executing a learning program. It is possible for the learning section 22 to observe state variables indicating the states of the printer 100. In the present embodiment, the state variables are a speed of the object to be transported, an acceleration of the object to be transported, a movement amount of the object to be transported, a start position of movement of the object to be transported, an ambient environment of the printer, a value of the current flowing through the motor, a type of the print medium printed by the printer, and an accumulated movement amount of the object to be transported.

Specifically, the learning section 22 obtains the actual speed of the PF motor 1 and the actual speed of the carriage 3 from the speed calculation section 6d of the motor controller 6 and regards them as the speeds of the object to be transported. Also, the learning section 22 obtains the actual speed of the PF motor 1 and the actual speed of the carriage 3 in a predetermined period and regards them as the acceleration of the object to be transported. Further, the learning section 22 integrates the actual speed of the PF motor 1 and the actual speed of the carriage 3 in a predetermined period (for example, a period from the start of the print medium 50 to the current time) and regards each as a movement amount of the object to be transported. The movement amount is stored in the memory 30.

Further, the learning section 22 obtains, from the position calculation section 6a of the motor controller 6, the actual positions of the PF motor 1 and the actual position of the carriage 3 at the time of starting printing on the print medium 50 and regards them as the start position of movement of the objects to be transported. Further, the learning section 22 obtains the ambient temperature and humidity of the printer 100 in accordance with the output signals of the sensor 40 and regards them collectively as the ambient environment of the printer. Further, the learning section 22 obtains a value of the current flowing through each motor based on a corresponding one of the current sensors coupled to the PF motor 1 and the CR motor 4.

Further, the learning section 22 controls the camera 8 to capture an image of the margin of the print medium 50, selects the type of the print medium 50 being transported by the PF roller 51 from predetermined types in accordance with predetermined image processing (for example, template matching and the Fourier transform, or the like), and regards the selected type as the type of the print medium 50 onto which printing is to be performed by the printer. Further, the learning section 22 obtains an accumulated value of the movement amounts described above stored in the memory 30 and regards the accumulated value as an accumulated movement amount of the object to be transported. In the present embodiment, it is possible for the learning section 22 to observe state variables at any timing and observe the initial state variables and state variables after changing the control parameters.

In the present embodiment, reinforcement learning is used. Accordingly, the learning section 22 determines an action that changes the control parameters based on the state variables and executes the action. By evaluating a reward in accordance with the state after the action, an action value of the action is identified. Thus, the learning section 22 optimizes the control parameters by repeating observation of the state variables, determination of an action in accordance with the state variables, and evaluation of a reward obtained by the action.

Figure 3:
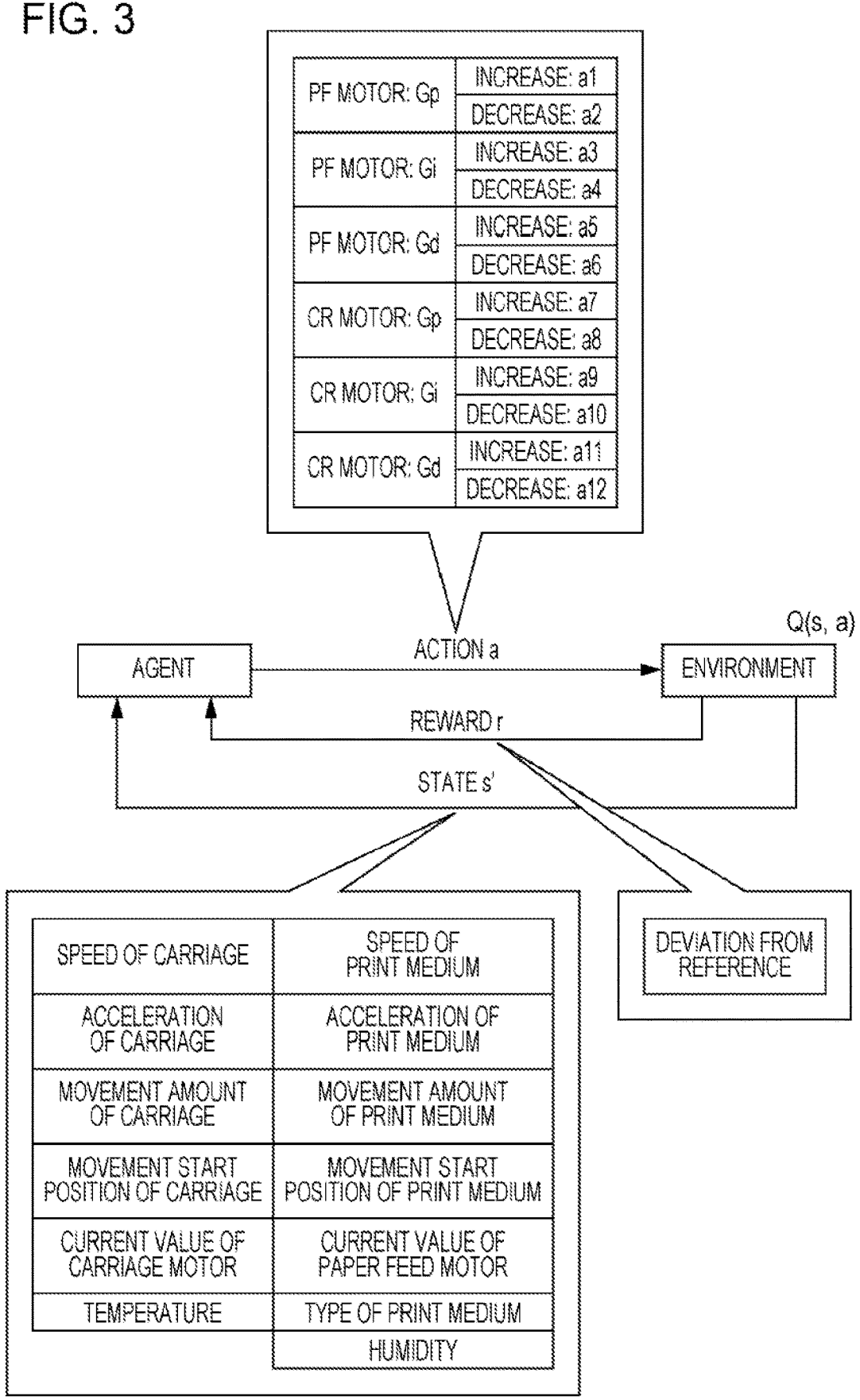
FIG. 3 is a diagram illustrating a learning example by reinforcement learning.

FIG. 3 is an explanatory diagram of a learning example of the control parameters in accordance with a model of the reinforcement learning including an agent and an environment. The agent illustrated in FIG. 3 corresponds to a function of selecting an action a in accordance with a predetermined policy. The environment corresponds to a function of determining the next state s' based on the action a selected by the agent and the current state s and determining an immediate reward r based on the action a, the state s, and the state s'.

In the present embodiment, the learning section 22 repeats the processing for selecting an action a by applying a predetermined policy and updating the state. Thereby, Q learning is used for calculating an action value function Q(s,a) of a certain action a in a certain state s. That is to say, in the present embodiment, the action value function is updated by the following expression (1). When the action value function Q(s,a) converges properly, the action a that maximizes the action value function Q(s,a) is regarded as the optimum action, and the control parameters that indicate the action a are regarded as the optimized parameters.

$$Q(s_t,a_t) \leftarrow (s_t,a_t) + \alpha(r_{t+1} + \gamma \max_a \cdot Q(s_{t+1},a') - Q(s_t,a_t)) \quad (1)$$

Here, the action value function Q(s,a) is an expectation value of a return (the total discount rewards in the example) that will be obtained in the state s in the future when the action a is taken. The reward is denoted by r, the subscript t of the state s, the action a, and the reward r is the number (referred to as a trial number) that indicates one trial process of the trial processes repeatedly performed in time series. When the state changes after determination of an action, the trial number is incremented. Accordingly, the reward $r_{t+1}$ in the expression (1) is a reward obtained when an action $a_t$ is selected in a state $s_t$, and the state becomes $s_{t+1}$. In the expression (1), α denotes a learning rate, and γ denotes a discount rate. Also, a' is an action that maximize the action value function $Q(s_{t+1},a_{t+1})$ among the action $a_{t+1}$ to be taken in the state $s_{t+1}$, and $\max_a \cdot Q(s_{t+1},a')$ is an action value function maximized by selecting the action a'. In this regard, a trial interval may be determined by various methods, and, for example, it is possible to employ a configuration in which a trial is performed $a_t$ a certain time interval, or the like.

In the learning of the control parameters, changing the control parameters corresponds to the determination of an action, and the information indicating the control parameters to be learned and the actions to be taken is recorded in the memory 30 in advance. FIG. 3 illustrates an example in which the control parameters related to the PID control among the control parameters are targeted for learning.

Specifically, among the control parameters, the constants Gp, Gi, and Gd used for controlling the PF motor 1 and the constants Gp, Gi, and Gd used for controlling the CR motor 4 are targeted for learning. Accordingly, in this example, the gains Kp for the PF motor 1 and the CR motor 4, and the like are not targeted for learning. However, of course, a control parameter other than the control parameters illustrated in FIG. 3 may be targeted for learning.

In the example in FIG. 3, there are actions that increase their values by a fixed vale and actions that decrease their values by a fixed vale. Accordingly, the total six parameters illustrated in FIG. 3 have 12 possible actions in total (action a1 to action a12). In the present embodiment, information (action ID, amount of increase or decrease by each action, and the like) for identifying each action is recorded in the memory 30.

In the example in FIG. 3, a reward is identified based on the deviation from a reference of the transport position of the object to be transported. In the present embodiment, the deviation from a reference is identified based on an image indicating the transport position of the object to be transported, which has been captured by the camera 8. In the present embodiment, the image indicating the transport position of the object to be transported is a captured image of an adjustment pattern printed by the printer 100 on the print medium 50.

That is to say, after the learning section 22 changes the control parameters as an action a, the learning section 22 controls the motor controller 6, the head driver 7, and the like to print a predetermined adjustment pattern on the print medium 50. In this regard, the adjustment pattern ought to be a pattern for identifying the transport position of the print medium 50 and the transport position of the carriage 3, and various patterns may be used.

In the present embodiment, the adjustment pattern is a pattern including straight lines. When an object (straight line) printed on the print medium 50 is larger than a predetermined size, the deviation from a reference is regarded to have occurred. Also, when the object printed on the print medium 50 is smaller than or equal to a predetermined size, the deviation from a reference is not regarded to have occurred.

Figure 4:
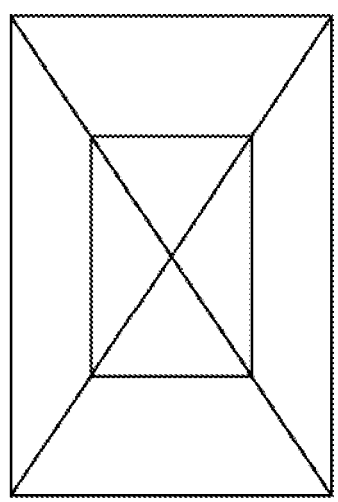
FIG. 4 is a diagram illustrating an adjustment pattern.

FIG. 4 is a diagram illustrating an example of an adjustment pattern. In the example, the adjustment pattern includes two rectangles having different sizes with a common center and the diagonals of the larger one of the rectangles. In this manner, at the time of printing a figure including lines, when the transport position of an object to be transported does not deviate from a reference and is controlled with high precision, the lines are expressed as lines having less than or equal to a predetermined width. However, when the transport position of the object to be transported deviates from the reference, the line becomes thicker than a predetermined width. When the deviation is large, the lines are separated.

Figure 5:
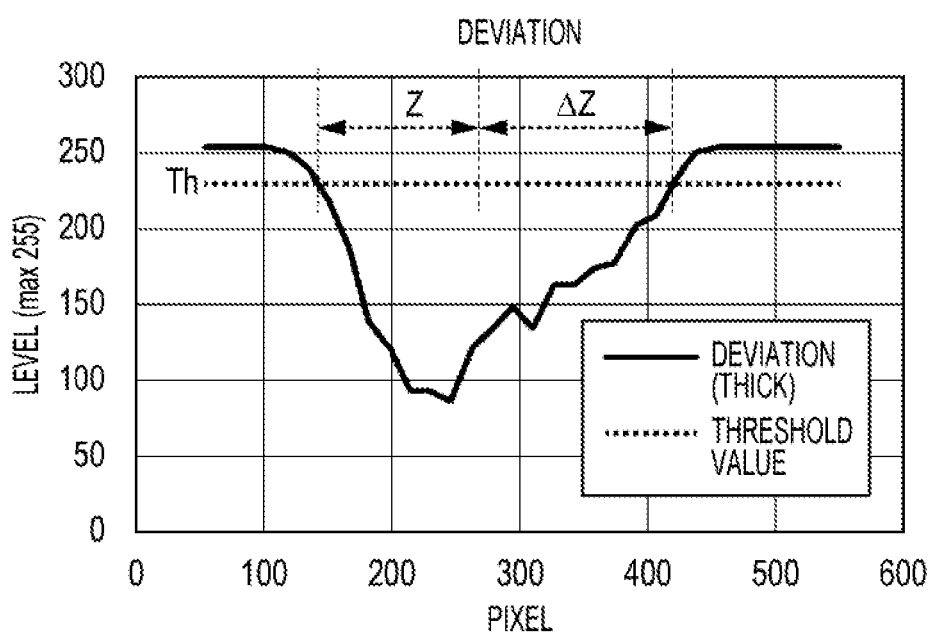
FIG. 5 is an explanatory diagram of deviation from reference.
Figure 6:
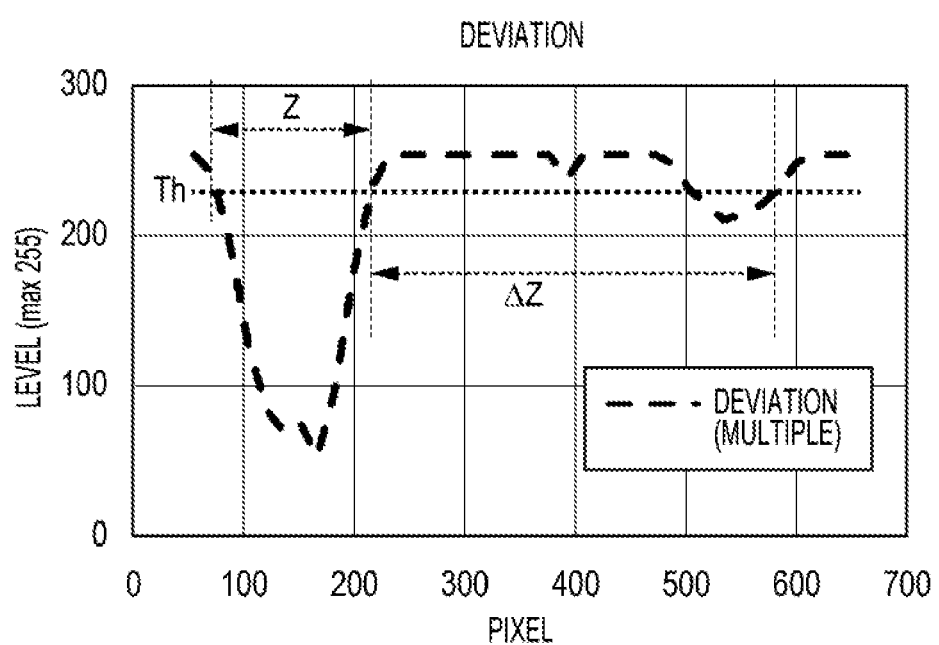
FIG. 6 is an explanatory diagram of deviation from reference.

Thus, in the present embodiment, the learning section 22 controls the camera 8 and causes the camera 8 to capture the image of the adjustment pattern. FIG. 5 and FIG. 6 are explanatory diagrams of the results of capturing the image. In FIG. 5 and FIG. 6, the horizontal axis indicates position in pixel units, and the vertical axis indicates luminance level. In the embodiment, an example is assumed in which the adjustment pattern of black lines is printed on the white print medium 50. Accordingly, as illustrated in FIG. 5 and FIG. 6, a portion including the image of the line have a lower luminance. In the present embodiment, a portion having a luminance lower than a threshold value Th is regarded as the image of the adjustment pattern.

In these examples, the ideal width of the line is denoted by a range Z. In FIG. 5, the line of the adjustment pattern measured by the camera 8 is thicker than the range Z, and thus it is understood that the transport position of the object to be transported deviates from the reference. In FIG. 6, the line of the adjustment pattern measured by the camera 8 is the same as the range Z, but there is a portion having a luminance lower than the threshold value Th near the range Z (within a predetermined distance). Accordingly, in the example illustrated in FIG. 6, the transport position of the object to be transported deviates greatly from the reference.

In the present embodiment, the deviation from a reference is evaluated by a range having a luminance lower than the threshold value Th. Specifically, the learning section 22 obtains ΔZ, which is the remainder when the range Z indicating the width of the line is subtracted from the range having a luminance lower than the threshold value Th as a deviation from a reference. Of course, the deviation from the reference may be evaluated by a plurality of places on the adjustment pattern or statistics may be taken. Also, the deviation from a reference may be obtained based on an adjustment pattern printed on a plurality of positions on the print medium 50.

In any case, the learning section 22 sets a reward such that the smaller the deviation from a reference ΔZ, the greater the reward (for example, 1/ΔZ, or the like). Of course, the reward may be defined by various methods, and, for example, the reward may be defined so as to be incremented by 1 when the deviation ΔZ is smaller than a threshold value, and decremented by 1 when the deviation ΔZ is larger than the threshold value. It is possible to use the other various definitions.

It is possible to identify the next state s' when the action a is adopted in the current state s by operating the printer 100 after the parameters are changed as the action a, and the learning section 22 observes the state variables. That is to say, the learning section 22 observes the speed of the print medium 50, the ambient temperature of the printer 100, and the like so as to obtain values indicating these as state variables.

2.2 Learning Example of Control Parameters

Next, a description will be given of a learning example of the control parameters. The information indicating the variables and the functions referenced in the learning process is stored in the memory 30. That is to say, the learning section 22 uses the configuration in which the action value function Q(s,a) converges by repeating the observation of the state variables, the determinations of actions in accordance with the state variables, and the evaluations of the rewards obtained by the actions. Thus, in the present embodiment, the time-series values of the state variables, the actions, and the rewards are recorded in the memory 30 in sequence in the learning process.

The action value function Q(s,a) may be calculated by various methods and may be calculated based on many trials. However, the present embodiment employs DQN (deep Q-network), which is one of methods for approximately calculating the action value function Q(s,a). In DQN, the action value function Q(s,a) is estimated by using a multilayer neural network. In the example, a multilayer neural network is employed in which a state s is used as input, and N selectable values of the action value function Q(s,a) are used as output.

Figure 7:
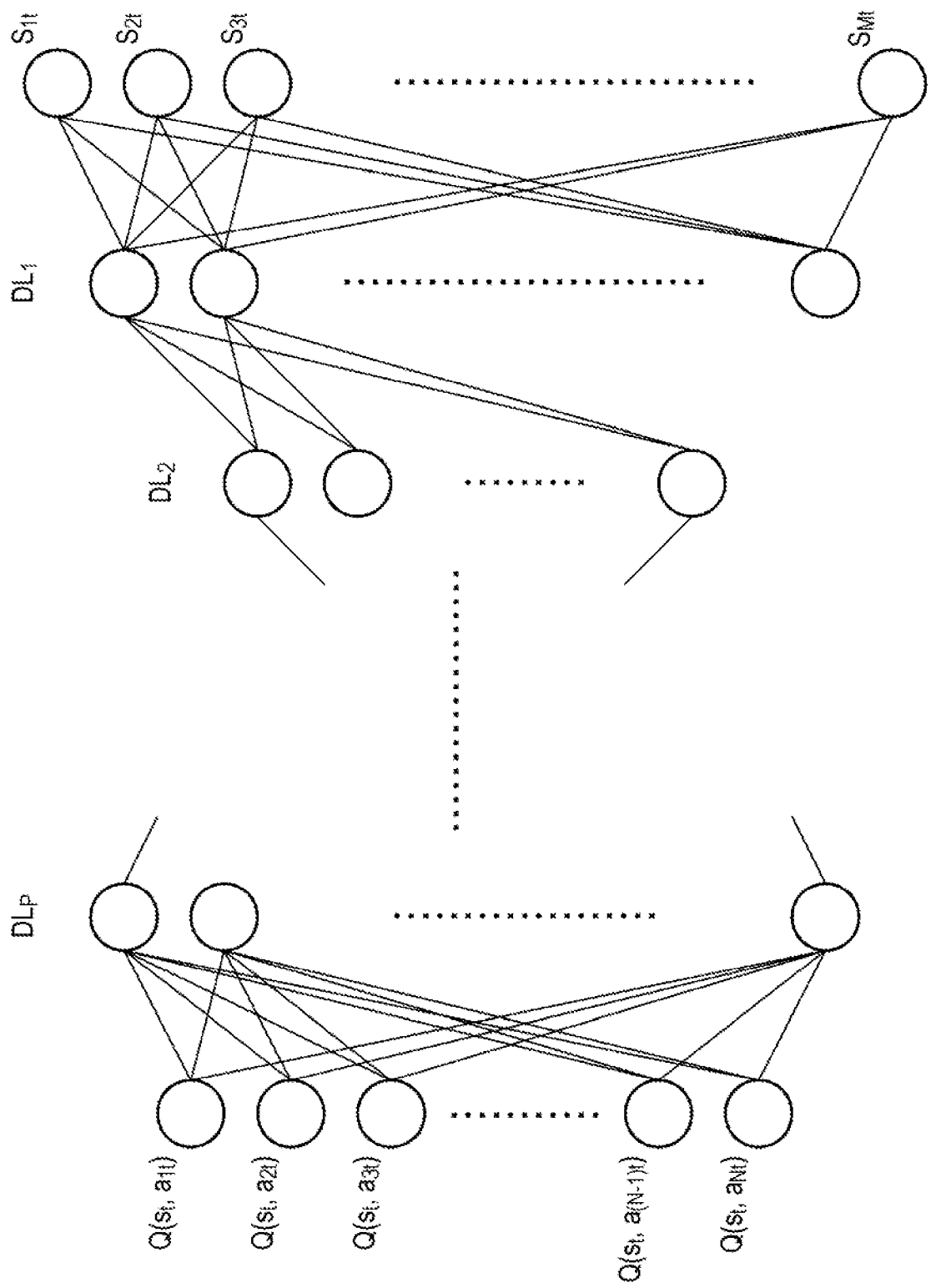
FIG. 7 is a diagram illustrating an example of a multilayer neural network.

FIG. 7 is a diagram schematically illustrating the multilayer neural network employed in the example. In FIG. 7, the multilayer neural network uses M (M is an integer of 2 or more) state variables as input and uses N (N is an integer of 2 or more) values of the action value function Q as output. For example, in the example in FIG. 3, there are 13 state variables, such as speed of the print medium, temperature, and the like, and thus M=13. The M values of the state variables are input to the multilayer neural network. In FIG. 7, M states at trial number t are denoted by $s_{1t}$ to $s_{Mt}$.

Reference sign N is the number of selectable actions a. The outputs of the multilayer neural network are values of the action value function Q when a specific action a is selected in the input state s. In FIG. 7, the corresponding action value functions Q of the selectable actions $a_{1t}$ to $a_{Nt}$ at trial number t are denoted by $Q(s_t, a_{1t})$ to $Q(s_t, a_{Nt})$. Reference sign $s_t$ included in Q at this time is a character that representatively denotes input states sit to $s_{Mt}$. In the example illustrated in FIG. 3, 12 actions are selectable, and thus N=12. Of course, the contents and the number of actions a (value of N), and the contents and the number of states s (value of M) may be changed depending on the trial number t.

The multilayer neural network illustrated in FIG. 7 is a model that performs calculation in which each node of each layer performs multiplication of a weight w and addition of a bias b on the input (state s in the first layer) of the immediately before layer, performs activation function as necessary, and obtains output (becomes input of the next layer). In this example, there are P (P is an integer of one or more) layers DL, and each layer has a plurality of nodes.

The multilayer neural network illustrated in FIG. 7 is identified by a weight w and a bias b, an activation function, the order of the layers, and the like in each layer. Thus, in the present embodiment, the parameters (information necessary for obtaining output from input) for identifying the multilayer neural network are recorded in the memory 30. In this regard, at the time of learning, variable values (for example, a weight w and a bias b) for identifying the multilayer neural network are to be updated among the parameters. Here, a parameter changeable in the learning process of the multilayer neural network is denoted by θ. By using θ at this time, it is also possible to express the above-described action value function $Q(s_t, a_{1t})$ to $Q(s_t, a_{Nt})$ as $Q(s_t, a_{1t}; θ_t)$ to $Q(s_t, a_{Nt}; θ_t)$.

Figure 8:
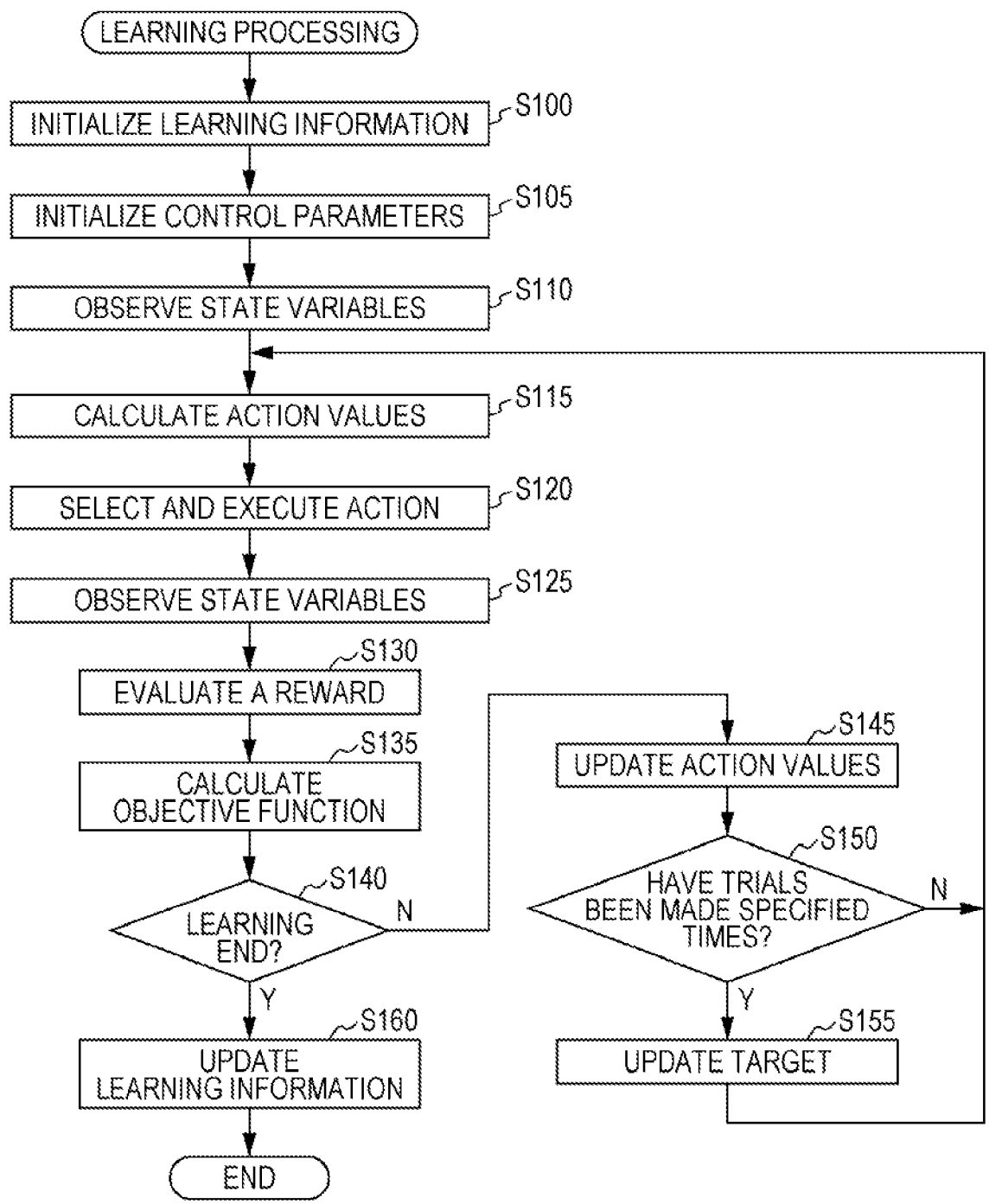
FIG. 8 is a flowchart of learning processing.

Next, a description will be given of the procedure of the learning processing with reference to a flowchart illustrated in FIG. 8. The learning processing of the control parameters is executed for each print speed (print mode) of the printer 100. When the learning processing is started, the learning section 22 initializes the learning information (step S100). That is to say, the learning section 22 identifies the initial value of θ, which is referenced at the time of starting the learning. The initial value may be determined by various methods, and, for example, when the learning was not performed in the past, any value, a random value, or the like may be used for the initial value of θ.

When learning was performed in the past, the learned θ is used as an initial value. Also, when learning was performed in the past on the similar conditions (type of the print medium, or the like), θ in the learning may be used as an initial value. The past learning may be performed by a user using the printer 100 or by the manufacturer of the printer 100 before being put on the market. In this case, the manufacturer may provide a set of a plurality of initial values in accordance with an object and the type of work, and a user may select an initial value at the time of learning. When the initial value of θ is determined, the initial value, which is a value of the current θ, is stored memory 30 as learning information.

Next, the learning section 22 initializes the control parameters (step S105). Here, the control parameters for the PID control are the learning targets, the learning section 22 initializes the control parameters on the PID control. That is to say, the learning section 22 sets the control parameters on the PID control used at the time of driving the printer 100 last (the control parameters set at shipment time when initially driven after shipment) as initial values. The initialized control parameters are stored in the memory 30 as the current control parameters.

Next, the learning section 22 observes the state variables (step S110). That is to say, the learning section 22 instructs the motor controller 6 on the current control parameters and causes to drive the PF motor 1 and the CR motor 4 using the current control parameters to control the printer 100. The learning section 22 obtains speed of the print medium 50, temperature, and the like as illustrated in FIG. 3 in the state after the control.

Next, the learning section 22 calculates action values (step S115). That is to say, the learning section 22 obtains θ by referring to the learning information stored in the memory 30 and inputs the latest state variables to the multilayer neural network indicated by the learning information stored in the memory 30 to calculate N action value functions $Q(s_t, a_{1t}; θ_t)$ to $Q(s_t, a_{Nt}; θ_t)$.

In this regard, the latest state variables are the observation result of step S110 at the time of initial execution and the observation result of step S125 at the time of the second execution and after that. Also, the trial number t becomes 0 at the time of initial execution and becomes a value of one or more. When the learning processing is not executed in the past, θ indicated by the learning information stored in the memory 30 is not optimized. Accordingly, a value of the action value might be an incorrect value as a value of the function Q, but the action value function Q is gradually optimized by the repetition of the processing of step S115 and after that. Also, in the processing of step S115 and after that, the state s, the action a, and the reward r are stored in the memory 30 in association with each trial number t and are able to be referenced any timing.

Next, the learning section 22 selects an action and executes the action (step S120). In the present embodiment, the processing for regarding the action a that maximizes the action value function Q(s,a) as the optimized action is performed. The learning section 22 thus identifies the maximum value among the values of N action value functions Q $(s_t, a_{1t}; \theta_t)$ to Q $(s_t, a_{Nt}; \theta_t)$, which have been calculated in step S115. The learning section 22 selects an action that gives the maximum value. For example, when Q($s_t$, $a_{Nt}$; et) is the maximum value among N action value functions Q($s_t$, $a_{1t}$; $\theta_t$) to Q($s_t$, $a_{Nt}$; $\theta_t$), the learning section 22 selects the action $a_{Nt}$.

When the learning section 22 selects an action, the learning section 22 changes the control parameters for the action. For example, in the example in FIG. 3, when the action a1 that increases the constant Gp in the proportional element of the PF motor 1 by a fixed value, the learning section 22 increases the constant Gp by the fixed value. When the control parameters are changed, the learning section 22 refers to the control parameters and controls the printer 100 to print the adjustment pattern.

Next, the learning section 22 observes the state variables (step S125). That is to say, the learning section 22 performs the same processing as the observation of the state variables in step S110 to obtain speed of the print medium 50, temperature, and the like as illustrated in FIG. 3 as the state variables. In this regard, when the current trial number is t (when the selected action is $a_t$), the state s obtained in step S125 is $s_{t+1}$.

Next, the learning section 22 evaluates a reward (step S130). That is to say, the learning section 22 controls the camera 8 (may transport the carriage 3 or the print medium 50 as necessary) to capture the image of the adjustment pattern. The learning section 22 obtains a deviation ΔZ from the reference based on the image of the adjustment pattern and obtains a reward corresponding to ΔZ. In this regard, when the current trial number is t, the reward r obtained in step S130 is $r_{t+1}$.

In the present embodiment, it is aimed to update the action value function Q illustrated in the expression (1). However, in order to properly update the action value function Q, it is necessary to optimize the multilayer neural network (optimization of θ) that indicates the action value function Q. In order for the action value function Q to properly output by the multilayer neural network illustrated in FIG. 7, it becomes necessary to have teaching data to be the target of the output. That is to say, it is expected that the multilayer neural network be optimized by improving θ such that the error between the output of the multilayer neural network and the target be minimized.

However, in the present embodiment, at the stage of not having completed learning, there is no knowledge about the action value function Q, and thus it is difficult to identify the target. Thus, in the present embodiment, by an objective function that minimizes the second term in the expression (1), a so-called TD error (temporal difference), θ that indicates the multilayer neural network is improved. That is to say, learning is performed on θ using $(r_{t+1}+\gamma\max_a \cdot Q(s_{t+1},a'; \theta_t))$ as a target, so as to minimize the error between the target and Q($s_t$, $a_t$; $\theta_t$). However, the target $(r_{t+1}+\gamma\max_a \cdot Q(s_{t+1},a'; \theta_t))$ includes the learning target θ, and thus in the present embodiment, the target is fixed for some number of trials (for example, fixed by θ that was learned last (the initial value of θ at the time of initial learning)). In the present embodiment, a predetermined number of trials, which are the number of trials for fixing the target, are determined in advance.

Learning is performed on such assumption, and thus when a reward is evaluated in step S130, the learning section 22 calculates an objective function (step S135). That is to say, the learning section 22 calculates objective functions for evaluating TD errors in the individual trials (for example, a function proportional to the expectation value of the TD error squared, the total of the TD error squared, and the like). In this regard, the TD error is calculated in the state in which the target is fixed, and thus when the fixed target is expressed as $(r_{t+1}+\gamma\max_a \cdot Q (s_{t+1}, a'; \theta-))$, the TD error is $(r_{t+1}+\gamma\max_a \cdot Q(s_{t+1},a'; \theta-)-Q(s_t, a_t; \theta_t))$. The reward $r_{t-1}$ in the expression of the TD error is the reward obtained by the action $a_t$ in step S130.

Also, $\max_a \cdot Q(s_{t+1},a'; \theta-)$ is the maximum value among the outputs obtained when the state $s_{t+1}$ calculated by the action $a_t$ in step S125 is used as input to the multilayer neural network identified by the fixed θ-. The term Q($s_t$, $a_t$; $\theta_t$) is an output value corresponding to the action $a_t$ among the outputs obtained when the state $s_t$ before selecting the action $a_t$ is used as input of the multilayer neural network identified by $\theta_t$ in the stage of the trial number t.

When an objective function is calculated, the learning section 22 determines whether or not the learning has ended (step S140). In the present embodiment, a threshold value for determining whether or not the TD error is sufficiently small is determined in advance. When the objective function is less than or equal to the threshold value, the learning section 22 determines that the learning has ended.

In step S140, when the learning section 22 does not determine that the learning has ended, the learning section 22 updates the action value (step S145). That is to say, the learning section 22 identifies a change of θ for making the objective function smaller based on the partial derivation of the TD error with respect to θ and changes θ. Of course, here, it is possible to change θ by various methods. For example, it is possible to employ a gradient descent method, such as RMSProp, or the like. Also, adjustment by a learning rate or the like may be suitably carried out. By the above-described processing, it is possible to change θ so as to bring the action value function Q close to the target.

However, in the present embodiment, the target is fixed as described above, and thus the learning section 22 further determines whether or not to update the target. Specifically, the learning section 22 determines whether or not a predetermined number of trials have been performed (step S150). In step S150, when the learning section 22 determines that the predetermined number of trials have been performed, the learning section 22 updates the target (step S155). That is to say, the learning section 22 updates θ referenced at the time of calculating the target with the latest θ. After this, the learning section 22 repeats the processing of step S115 and after that. On the other hand, when the learning section 22 does not determine that the predetermined number of trials have been performed in step S150, the learning section 22 skips step S155 and repeats the processing of step S115 and after that.

In step S140, when the learning section 22 determines that the learning has ended, the learning section 22 updates the learning information stored in the memory 30 (step S160). That is to say, the learning section 22 stores θ obtained by the learning in the memory 30 as the machine-learned model 31 to be referenced at the time of printing by the printer 100. When the machine-learned model 31 including θ at this time in the memory 30, it becomes possible for the controller 21 to obtain the control parameters optimized for the current printer 100 before printing.

3. Print Processing

Figure 9:
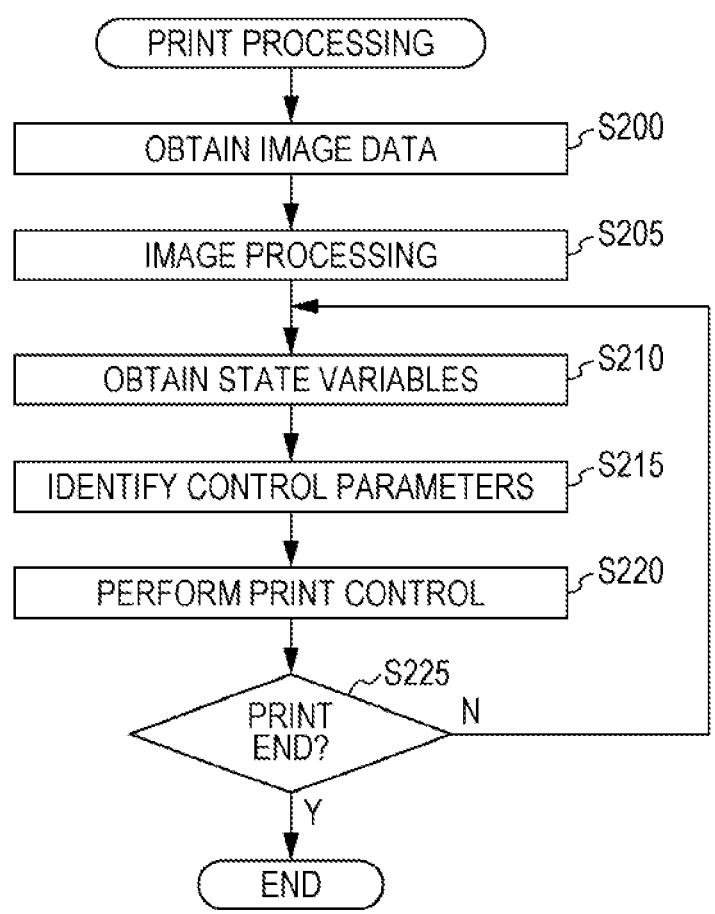
FIG. 9 is a flowchart of print processing.

In the state in which the machine-learned model 31 is stored in the memory 30, it is possible for the controller 21 to control the printer 100 using the optimized control parameters. FIG. 9 is a flowchart illustrating the print processing at the time of performing printing by the printer 100. The print processing is executed in the state in which a user specifies the image data stored in a computer or an external storage medium, which is not illustrated in the figure, or the like as a print target and specifies a print speed (print mode).

When the print processing is started, the controller 21 obtains image data (step S200). That is to say, the controller 21 obtains the image data specified by a user from a computer, an external storage medium, or the like, which is not illustrated in the figure. Next, the controller 21 performs image processing (step S205). That is to say, the controller 21 performs image processing for converting the image indicated by the image data to print data expressed by presence or absence of a record of an ink droplet for each pixel. The image processing may be performed by a publicly known method, and is, for example, realized by color conversion processing, gamma conversion processing, or the like.

Next, the controller 21 obtains the state variables (step S210). That is to say, the controller 21 obtains the actual speed of the PF motor 1 and the actual speed of the carriage 3 from the speed calculation section 6d of the motor controller 6 and regards them as the respective speeds of the objects to be transported. Also, the learning section 22 obtains changes of actual speed of the PF motor 1 and the actual speed of the carriage 3 respectively in a predetermined time period and regards them as respective accelerations of the objects to be transported. Further, the learning section 22 integrates the actual speed of the PF motor 1 and the actual speed of the carriage 3 during a predetermined period (for example, a period from the start of printing on the print medium 50 to the current time) and regards them as the movement amounts of the respective objects to be transported. The movement amounts are stored in the memory 30.

Further, the learning section 22 obtains the actual position of the PF motor 1 and the actual position of the carriage 3 at the time of starting printing on the print medium 50 from the position calculation section 6a of the motor controller 6 and regards them as the start position of movements of the respective objects to be transported. Further, the learning section 22 obtains the ambient temperature and humidity of the printer 100 based on the output signal of the temperature and humidity sensor 40 and regards them as the ambient environment of the printer. Further, the learning section 22 obtains a value of the current flowing through each motor based on a corresponding one of the current sensors coupled to the PF motor 1 and the CR motor 4.

Further, the learning section 22 controls the camera 8 to capture an image of the margin of the print medium 50, selects the type of the print medium 50 being transported by the PF roller 51 from a predetermined types based on predetermined image processing (for example, template matching, the Fourier transform, or the like), and regards the type as a type of the medium 50 to be printed by the printer. Further, the learning section 22 obtains accumulated values of the movement amounts described above stored in the memory 30 and regards them as the accumulated movement amounts of the respective objects to be transported.

Next, the controller 21 identifies the control parameters (step S215). That is to say, the controller 21 refers to the machine-learned model 31 and calculates output Q(s,a) using the state variables obtained in step S210. Also, the controller 21 selects an action a that gives the maximum value among the outputs Q(s,a). When an action a is selected, the controller 21 identifies the control parameters so as to output the values corresponding to the state in which the action a is taken.

Next, the controller 21 performs print control (step S220). That is to say, the controller 21 obtains the time-series target positions of the PF motor 1 and the CR motor 4 and the drive timing of the head, which are necessary for printing the image, based on the data obtained in step S205. The controller 21 instructs the motor controller 6 on a control target to cause the PF motor 1 and the CR motor 4 to drive the PF roller 51 and the carriage 3 to the respective target positions. In this regard, in the present embodiment, the control parameters are optimized each time a predetermined range is printed, and thus print control for printing a predetermined range is performed in step S220.

Next, the controller 21 determines whether or not the printing has ended (step S225). That is to say, when printing is performed on all the data obtained in step S205, the controller 21 determines that the printing has ended. In step S225, when the controller 21 does not determine that the printing has not ended, the controller 21 repeats the processing in step S210 and after that. That is to say, in the present embodiment, when the state variables has changed by printing a predetermined range, the control parameters are optimized by following that change.

On the other hand, when the controller 21 determines that the printing has not ended in step S225, the controller 21 terminates the print processing. With the configuration described above, it is possible to perform printing while selecting an action a that maximizes the action value function Q. The action value function Q is optimized as a result of the repetition of many trials by the above-described processing. The trials are automatically performed by the learning section 22, and thus it is possible to easily perform as many trails as the degree not possible by human effort. Accordingly, with the present embodiment, it is possible to optimize the control parameters with higher probability than the control parameter determined by human effort.

By performing printing using the optimized control parameters, it is possible to perform control to make the transport positions of the objects to be transported close to references (to increase the positioning accuracy). Also, it is possible to maintain a state in which the transport positions of the objects to be transported are close to the references (the positioning accuracy is high) over a long time. In this regard, in the present embodiment, the control parameters are changed each time printing on a predetermined range is performed. However, of course, the change frequency of the control parameters is determined by any way. For example, in the printing process on one sheet of the print medium 50, the control parameters may be fixed, or the like.

4. Other Embodiments

The embodiment described above is one example for carrying out the present disclosure, and the other various embodiments are possible. For example, the printer and the learning device may be a complex machine having a facsimile communication function, and the like. Also, the printer and the learning device may be configured by a plurality of devices. For example, a device that stores the machine-learned model 31 and a device that perform printing by the controller 21 may be different devices.

Of course, the printer and the learning device may be different devices. When the printer and the learning device are different devices, the learning device may collect the state variables from a plurality of printers and machine learning may be performed on the machine-learned model 31 applicable to a plurality of printers by taking an action by each printer. Further, a part of the components in the embodiment described above may be omitted and the order of the processing may be changed or part of the processing may be omitted.

A printer includes motors for transporting objects to be transported. That is to say, a printer has a configuration in which an object to be transported that changes its position with printing is transported by the driving force of a motor. An object to be transported may be an object transported by the drive amount of a motor and is not limited to a print medium and a carriage in the embodiment described above. For example, when parts, such as an ADF, a cassette, and the like are moved by the driving force of a motor, these parts may be objects to be transported.

The state variables ought to include at least one of the speed of an object to be transported, the acceleration of an object to be transported, the movement amount of an object to be transported, the movement start position of an object to be transported, the ambient environment of a printer, the value of a current flowing through a motor, the type of a print medium printed on a printer, and the accumulated movement amount of an object to be transported. The state variables may be a combination of any number of elements. Of course, the state variables may include the other elements. Also, the possible elements to become the state variables include the possible elements to become the control parameters. For example, the speed of an object to be transported, the acceleration of an object to be transported, and the like may be control parameters (control targets).

The speed, the acceleration, and the movement amount of an object to be transported may be the amount identified based on the position of an object to be transported for each time and are not limited to elements identified based on the output of an encoder. For example, the speed, the acceleration, the movement amount may be identified based on the output of an optical sensor that identifies the position of an object to be transported. The movement amount ought to be measured in a predetermined time period and is different from the accumulated movement amount in this sense. The example of the predetermined time period is a time period from the start of printing on a certain print medium to the end of the printing, or the like.

The start position of movement of an object to be transported may be a position of the object to be transported by a predetermined trigger. For example, a start of print may be a trigger, or in bidirectional printing, the trigger may be immediately before a start of forward movement of the carriage or immediately before a start of backward movement, and the like. The ambient environment of a printer is not limited to temperature and humidity and may be an environment capable of influencing the operation of an object to be transported, a motor, a part of the printer, and the like. For example, the ambient environment may be presence or absence of vibration, the hardness of the installation site of a printer, and the like and may include various elements. In this regard, the measurement position where the ambient environment, such as temperature, humidity, or the like, is measured may be various positions.

The type of the print medium is the quality of the material, or the like constituting the print medium and may include various elements other than the elements identified by a camera. For example, the type of the print medium may be specified by a user, or a sensor for detecting the type of the print medium may be disposed.

The control parameters may be parameters that cause the control contents of the motor to vary by changing the parameters. The machine-learned model needs only to output, from the control parameters, a parameter that brings the transport position of an object to be transported close to a reference in the state indicated by the state variables. Of course, there is a possibility that a control parameter may exist that brings the transport position of an object to be transported closer to a reference than the control parameter output by the machine-learned model. However, by performing control using the control parameters output by the machine-learned model, or by repeating updates of the control parameters, learning may be performed such that the transport position of an object to be transported is brought closer to a reference than the current situation.

The state variables needs only to indicate a state obtained as a result of changing the control parameters, and may be numeric values, flags, or sings expressing various states. The machine-learned model may be a numerical expression model that outputs the control parameter by inputting the state variables. It is possible to use various models other than a model learned by reinforcement learning.

That is to say, the machine learning may be processing that learns better parameters using sample data. It is possible to use the machine learning in which learning is performed on each parameter by various methods other than the reinforcement learning described above, such as supervised learning, clustering, and the like. The learning model is not limited to the one described in the above-described embodiment. For example, various neural networks, such as an NN (neural network), a CNN (convolutional neural network), an RNN (recurrent neural network), or the like may be used as machine-learned models, and a combined model of these models may be used as a machine-learned model.

The controller needs only to be capable of performing printing by controlling a motor using the control parameters obtained by a machine-learned model. That is to say, the controller may perform printing by changing the control parameters and operating the motor using the changed control parameters. Of course, various control may be performed for controlling printing. For example, various kinds of image processing may be performed, and various control may be performed depending on the configuration of the printer, such as presence or absence of bidirectional printing, control of ink dots, adjustment of the toner amount in accordance with the print speed, and the like.

The action in the reinforcement learning may be an action that changes the control parameters. That is to say, the processing that changes the control parameters so as to change the control contents of the motor is regarded as an action. The possible options for an action may be various modes other than the embodiment described above. For example, in the above-described embodiment, an action is the processing that changes one of the proportional gain, the integral gain, or the derivative gain in the PID control by a predetermined amount. An action that changes two or more types out of these gains may be an option for the action.

Also, the processing for changing the other control, for example, the processing that changes the control target of acceleration control may be an option for the action, the processing that changes a target position or a target speed may be an option for the action.

Further, in the above-described learning processing, an action value is updated by updating θ for each trial, and the target is fixed until a predetermined number of trials are carried out. However, θ may be updated after a plurality of trials are carried out. For example, a target is fixed until the first predetermined number of trials are carried out, and θ is fixed until the second predetermined number of trials (< the first predetermined number) are carried out. In this case, after the second predetermined number of trials are carried out, θ is updated based on the second predetermined number of samples, and further, when the number of trials exceeds the first predetermined number, the target is updated with the latest θ.

Further, in the learning processing, a publicly known various method may be used, and for example, experience replay, reward clipping, and the like may be performed. Further, in FIG. 7, there are P (P is an integer of one or more) layers DL, and there are a plurality of nodes in each layer. However, various structures may be used for each layer. For example, it is possible to use various number of layers and various number of nodes. It is possible to use various functions as an activation function, and the network structure may be a convolutional neural network structure, or the like. Also, the modes of input and output are not limited to the example illustrated in FIG. 7. For example, it may be possible to use at least a configuration in which a state s and an action a are input, and a configuration in which an action a that maximizes the action value function Q is output as a one-hot vector.

In the embodiment described above, a greedy policy for the optimized action value function is regarded as an optimal policy by optimizing the action value function while carrying out trials to take actions by a greedy policy based on an action value function. This processing is so-called value iteration. However, learning may be performed by the other methods, for example, policy iteration. Further, various kinds of normalization may be performed in various variables, such as a state s, an action a, a reward r, and the like.

Various methods may be used for the method of machine learning, and trials may be carried out by an ε-greedy policy based on the action value function Q. Also, the method of reinforcement learning is not limited to the Q learning as described above, and methods, such as SARSA, and the like may be used. Also, a method may be used in which the model for a policy and the model for an action value function are separated. For example, an actor-critic algorithm may be used. When an actor-critic algorithm is used, $\mu(s; \theta)$, which is an actor indicating a policy, and $Q(s,a; \theta)$, which is a critic indicating an action value function may be defined, an action may be generated in accordance with the policy in which noise is added to $\mu(s; \theta)$ and tried, and learning may be performed on the policy and the action value function by updating the actor and the critic based on the trial result.

What is claimed is:

1. A printer including a motor for transporting an object to be transported, the printer comprising:
    a camera configured to capture an image indicating the transport position of the object;
    a memory storing a machine-learned model that has been obtained from a multilayer neural network including a plurality of layers and each layer including a plurality of nodes and each node including a weight and a bias that are updated during learning and the machine-learned model is configured to output a control parameter of the motor that brings a transport position of the object to be transported close to a reference based on one or more state variables including at least one of a speed of the object to be transported, an acceleration of the object to be transported, a movement amount of the object to be transported, a start position of movement of the object to be transported, an ambient environment of the printer, a value of a current flowing through the motor, a type of a print medium onto which printing is to be performed by the printer, and an accumulated movement amount of the object to be transported; and
    a controller configured to control the motor to perform printing by using the control parameter obtained based on the machine-learned model.

2. The printer according to claim 1, wherein
learning of the machine-learned model is performed by observing at least one of the state variables, determining an action to change the control parameter based on the observed state variables, and optimizing the control parameter based on a deviation from the reference of the transport position of the object to be transported.

3. The printer according to claim 2, wherein
the deviation from the reference is identified based on the image indicating the transport position of the object to be transported captured by the camera included in the printer.

4. The printer according to claim 3, wherein
the image indicating the transport position of the object to be transported is a captured image of an adjustment pattern printed by the printer on a print medium.

5. The printer according to claim 2, wherein
when an object printed on the print medium is larger than a specified size, the deviation from the reference is assumed to have occurred, whereas
when an object printed on the print medium is smaller than or equal to the specified size, the deviation from the reference is assumed to have not occurred.

6. The printer according to claim 2, wherein
based on a reward that increases as the deviation from the reference decreases, learning of the machine-learned model is performed by optimization of the control parameter by repeating observation of the state variables, determination of the action in accordance with the state variables, and evaluation of the reward obtained by the action.

7. The printer according to claim 1, wherein
the machine-learned model is learned for each print speed of the printer.

8. A learning device that learns a machine-learned model that is referenced by a printer including a motor for transporting an object, the learning device comprising:
    a learning section configured to obtain a model from a multilayer neural network including a plurality of layers and each layer including a plurality of nodes and each node including a weight and a bias that are updated during learning, such that the model is the machine-learned model that is configured to output a control parameter which determines an operation of the motor such that a transport position of the object to be transported is close to a reference, wherein the machine-learned model is based on an image indicating the transport position of the object and one or more state variables including at least one of a speed of the object to be transported, an acceleration of the object to be transported, a movement amount of the object to be transported, a start position of movement of the object to be transported, an ambient environment of the printer, a value of a current flowing through the motor, a type of a print medium onto which printing is to be performed by the printer, and an accumulated movement amount of the object to be transported.

9. A method of learning a machine-learned model that is referenced by a printer including a motor for transporting an object, the method comprising:

obtaining a model from a multilayer neural network including a plurality of layers and each layer including a plurality of nodes and each node including a weight and a bias that are updated during learning, such that the model is the machine-learned model that is configured to output a control parameter which determines an operation of the motor such that a transport position of the object to be transported is close to a reference, wherein the machine-learned model is based on an image indicating the transport position of the object and one or more state variables including at least one of a speed of the object to be transported, an acceleration of the object to be transported, a movement amount of the object to be transported, a start position of movement of the object to be transported, an ambient environment of the printer, a value of a current flowing through the motor, a type of a print medium onto which printing is to be performed by the printer, and an accumulated movement amount of the object to be transported.

* * * * *